United States Patent
Voleti et al.

(10) Patent No.: US 10,046,539 B2
(45) Date of Patent: Aug. 14, 2018

(54) SECONDARY REINFORCEMENT AT INTERFACE OF LAMINATE STRUCTURE

(71) Applicant: United Technologies Corporation, Hartford, CT (US)

(72) Inventors: Sreenivasa R. Voleti, Farmington, CT (US); Christopher M. Quinn, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 112 days.

(21) Appl. No.: 14/798,495

(22) Filed: Jul. 14, 2015

(65) Prior Publication Data
US 2016/0023429 A1   Jan. 28, 2016

Related U.S. Application Data

(60) Provisional application No. 62/027,439, filed on Jul. 22, 2014.

(51) Int. Cl.
*B32B 5/12* (2006.01)
*B32B 37/14* (2006.01)
*B32B 5/14* (2006.01)
*B32B 7/12* (2006.01)
(Continued)

(52) U.S. Cl.
CPC ............. *B32B 5/12* (2013.01); *B32B 5/145* (2013.01); *B32B 7/12* (2013.01); *B32B 27/08* (2013.01);
(Continued)

(58) Field of Classification Search
CPC ........ B32B 2260/023; B32B 2307/558; B32B 5/12; B32B 2262/106; B32B 5/26; B32B 5/28; Y10T 428/24992; Y10T 442/198; Y10T 428/26; Y10T 428/24994; Y10T 428/30; B29K 2105/167; B29K 2105/105; C01B 2202/02; C01B 2202/04; C01B 2202/06; C08J 5/24; Y10S 977/742; Y10S 977/745; Y10S 977/75; Y10S 977/752; Y10S 977/778; Y10S 977/847; B29C 70/081
(Continued)

(56) References Cited

U.S. PATENT DOCUMENTS

6,265,333 B1   7/2001   Dzenis et al.
7,344,617 B2   3/2008   Dubrow
(Continued)

FOREIGN PATENT DOCUMENTS

WO   2012019819   2/2012
WO   2013/032620   3/2013

OTHER PUBLICATIONS

European Search Report for European Patent Application No. 15177957.6 completed Oct. 19, 2015.

*Primary Examiner* — Camie S Thompson
(74) *Attorney, Agent, or Firm* — Carlson, Gaskey & Olds, P.C.

(57) ABSTRACT

A composite article includes a laminate structure of at least first and second fiber layers. Each of the layers includes a network of primary reinforcement fibers disposed in a matrix. The layers are bonded to each other along an interface of the matrices. The matrices include a concentration of secondary reinforcement particles locally at the interface to strengthen the interface.

20 Claims, 2 Drawing Sheets

FIG.2

(51) Int. Cl.
    *B32B 27/08*    (2006.01)
    *B32B 27/38*    (2006.01)

(52) U.S. Cl.
    CPC .............. *B32B 27/38* (2013.01); *B32B 37/14* (2013.01); *B32B 2255/10* (2013.01); *B32B 2255/20* (2013.01); *B32B 2262/02* (2013.01); *B32B 2262/0269* (2013.01); *B32B 2262/101* (2013.01); *B32B 2262/106* (2013.01); *B32B 2305/30* (2013.01); *B32B 2307/50* (2013.01)

(58) Field of Classification Search
    USPC .......... 428/298.1, 411.1; 442/58; 156/60, 62
    See application file for complete search history.

(56) References Cited

U.S. PATENT DOCUMENTS

| | | | |
|---|---|---|---|
| 7,651,769 | B2 | 1/2010 | Dubrow |
| 8,337,979 | B2 | 12/2012 | Wardle et al. |
| 8,545,963 | B2 | 10/2013 | Alberding et al. |
| 2004/0067364 | A1 | 4/2004 | Ishikawa et al. |
| 2008/0286564 | A1* | 11/2008 | Tsotsis .................... B29C 70/44 428/332 |
| 2010/0098931 | A1 | 4/2010 | Daniel et al. |
| 2012/0118615 | A1 | 5/2012 | Lee |
| 2012/0123061 | A1 | 5/2012 | Cheng et al. |
| 2013/0052897 | A1* | 2/2013 | Rogers .................... B32B 27/12 442/58 |
| 2013/0206273 | A1 | 8/2013 | Guest et al. |
| 2015/0132553 | A1 | 5/2015 | Fukuda et al. |
| 2015/0283788 | A1* | 10/2015 | Tsotsis .................... B32B 27/18 442/393 |

* cited by examiner

SECONDARY REINFORCEMENT AT INTERFACE OF LAMINATE STRUCTURE

CROSS-REFERENCE TO RELATED APPLICATION

The present disclosure claims priority to U.S. Provisional Patent Application No. 62/027,439, filed Jul. 22, 2014.

BACKGROUND

This disclosure relates to laminate composites. Laminate composites include fiber-reinforced layers that are bonded together. For example, fiber-reinforced polymer matrix composites can be fabricated by stacking pre-impregnated fiber plies on one another and then consolidating the stack under heat and pressure to cure the polymer and shape the plies to a desired geometry.

SUMMARY

In a feature embodiment, a composite article includes a laminate structure of at least first and second fiber layers, each of the first and second fiber layers including a network of primary reinforcement fibers dispersed in a matrix. The first and second fiber layers re bonded to each other along an interface of the matrices, the matrices including a concentration of secondary reinforcement particles locally at the interface.

In another embodiment according to the previous embodiment, the secondary reinforcement particles include nanoparticles.

In another embodiment according to any of the previous embodiments, the secondary reinforcement particles include nanotubes.

In another embodiment according to any of the previous embodiments, the secondary reinforcement particles include nanotubes.

In another embodiment according to any of the previous embodiments, the concentration of secondary reinforcement particles locally at the interface is approximately 5% or less by weight and the matrices include an overall concentration of the secondary reinforcement particles that is less than the concentration at the interface.

In another embodiment according to any of the previous embodiments, the concentration of secondary reinforcement particles locally at the interface is 0.5% or less by weight.

In another embodiment according to any of the previous embodiments, the concentration of secondary reinforcement particles locally at the interface is 0.1% or less by weight.

In another embodiment according to any of the previous embodiments, a concentration of the secondary reinforcement particles in the matrices, outside of the interface, is zero.

In another embodiment according to any of the previous embodiments, the secondary reinforcement particles are dispersed uniformly locally at the interface.

In another embodiment according to any of the previous embodiments, the network of primary reinforcement fibers are selected from the group consisting of carbon fibers, glass fibers, high-strength polymer fibers, and combinations thereof, and the matrices are polymer-based.

In another featured embodiment, a method of fabricating a composite article includes applying secondary reinforcement particles to a surface of a first fiber layer that is to be bonded with a second fiber layer, each of the first and second fiber layers includes a network of primary reinforcement fibers disposed in a matrix, bringing the first and second fiber layers together such that the second fiber layer is in contact with the surface of the first fiber layer that has the secondary reinforcement particles, and bonding the first and second fiber layers together at an interface, the interface includes a concentration of the secondary reinforcement particles locally at the interface to strengthen the interface.

In another embodiment according to the previous embodiment, the applying of the secondary reinforcement particles includes spraying the secondary reinforcement particles.

In another embodiment according to any of the previous embodiments, during the applying of the secondary reinforcement particles, the secondary reinforcement particles are carried in a fluid carrier.

In another embodiment according to any of the previous embodiments, the fluid carrier includes an organic solvent.

In another embodiment according to any of the previous embodiments, the fluid carrier includes a polymer.

In another embodiment according to any of the previous embodiments, the fluid carrier includes a first polymer and the matrices are polymer-based and include a second polymer, the first polymer and the second polymer having equivalent chemical composition.

In another featured embodiment, a composite article includes a laminate structure of at least first and second fiber layers, each of the first and second fiber layers including a network of primary reinforcement fibers selected from the group consisting of carbon fibers, glass fibers, high-strength polymeric fibers, and combinations thereof, disposed in a polymer-based matrix. The first and second fiber layers are bonded to each other along an interface of the polymer-based matrices, the polymer-based matrices including a local concentration of 5% or less by weight of carbon nanotubes at the interface to strengthen the interface and an overall concentration of carbon nanotubes that the less than the concentration at the interface.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
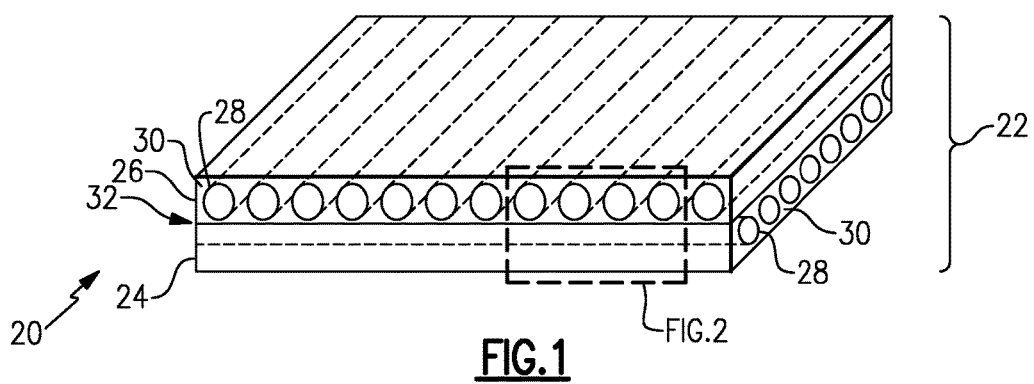
FIG. 1 illustrates an example composite article that includes a concentration of secondary reinforcement particles locally at an interface between fiber layers.

FIG. 1 illustrates a representative portion of an example composite article 20. As will be appreciated, the composite article 20 is shown in simplistic form for the purposes of description but can have the geometry of an end-use article. Example end-use articles that may benefit from this disclosure can include, but are not limited to, gas turbine engine articles, such as airfoils, cases, and airfoil platforms.

Laminate fiber-reinforced composites can be relatively weak at the interface between layers. For example, in polymer matrix composites, the localized region in the interface is polymer-rich relative to the remaining bulk of the composite, which is reinforced by the fibers. The interface can thus be a point of weakness in interlaminar tension and interlaminar shear, while the composite is much stronger in the plane of the fibers of the layers. In this regard, the composite article 20 described herein includes features for enhanced strength at such interfaces.

The composite article 20 includes a laminate structure 22. In this example, the laminate structure 22 includes at least a first fiber layer 24 and a second fiber layer 26. However, it is to be appreciated that the composite article 20 can include additional layers according to the examples herein.

Each of the fiber layers 24 and 26 includes a network of primary reinforcement fibers 28 (hereafter "fibers 28") dispersed in a matrix 30. The fibers 28 and the matrix 30 can be selected according to the design requirements of the end-use application. In further examples, for polymer matrix composites, the fibers 28 can be selected from carbon fibers, glass fibers, high-strength polymer-based fibers, and combinations thereof. One example of a high-strength polymer-based fiber is an aramid fiber, but other high-strength polymer-based fibers can alternatively or additionally be used.

In this example, the fibers 28 or networks of primary reinforcement fibers 28 in each of the respective layers 24 and 26 are unidirectional fibers 28 or networks. Thus, the fibers 28 in the layer 24 run parallel to each other, and the fibers 28 in the layer 26 run parallel to each other. The layers 24 and 26 are cross-plied such that the fibers 28 in the respective layers 24 and 26 are angled relative to each other. For example, the fiber 28 can have a 0°/90° arrangement, but other arrangements can alternatively be used. The fibers 28 or networks of fibers 28 are not limited to unidirectional fibers 28 or networks, and can also be woven fabrics, braids, 3D weaves, non-woven structures, random structures, or variations thereof can alternatively or additionally be used.

The matrix 30 can be a polymer-based matrix. Example polymer-based matrices can include thermoset polymers. In another example, the matrices can include thermoset polymers. Epoxy is one example thermoset polymer, but other thermosetting polymers can alternatively be used. The polymer-based matrix is composed primarily of polymer, but can include additives to enhance strength, toughness, durability, or other properties.

Figure 2:
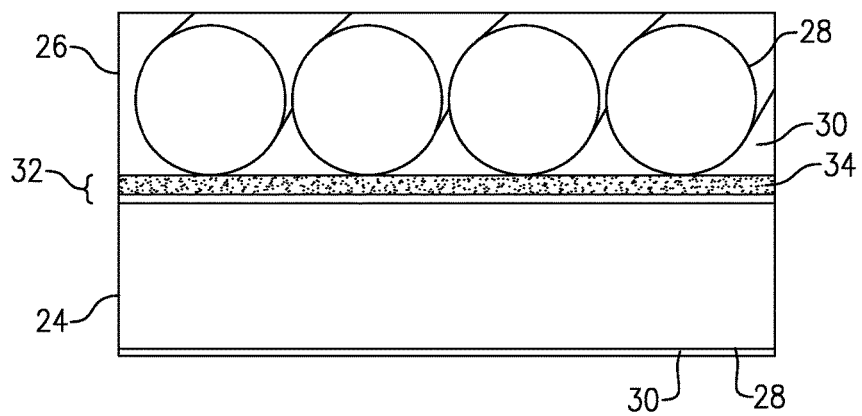
FIG. 2 illustrates an enlarged view of a portion of the composite article of FIG. 1 at the interface.

The fiber layers 24 and 26 are bonded to each other along an interface 32 of the matrices 30. FIG. 2 illustrates an enlarged view of a portion of the composite article 20 at the interface 32, according to the section shown in FIG. 1. During fabrication of the composite article 20, the plies of fiber layers 24 and 26 are brought together and bonded along the interface 32. Normally, there is a polymer-rich localized region at such an interface that is relatively weak. However, the matrices 30 herein include a concentration of secondary reinforcement particles 34 at the interface 32. The secondary reinforcement particles 34 act to reinforce, and thus strengthen, the interface 32. Thus, the primary reinforcement fibers 28 enhance the overall, bulk strength of the composite article 20, while the secondary reinforcement particles 34 strengthen the interface 32. In examples where there are more than the two layers 24 and 26, each such interface 32 will include the secondary reinforcement particles 34.

The secondary reinforcement particles 34 are concentrated at the interface 32. Thus, the remaining portion of the matrices 30 have a lower concentration of the secondary reinforcement particles 34 or are completely free of any of the secondary reinforcement particles 34. For example, the overall concentration of the secondary reinforcement particles 34 in the matrices 30 is less than the concentration locally at the interface 32.

In additional examples, the secondary reinforcement particles 34 are nanoparticles. Nanoparticles have at least one dimension that is less than 500 nanometers. In further examples, the nanoparticles are nanotubes, such as carbon nanotubes. The carbon nanotubes can be surface-functionalized with organic molecules to promote bonding with the selected matrices 30. For instance, the organic molecules can include amine groups, hydroxyl groups, or other functional groups that are chemically compatible with the composition selected for the matrices 30.

In further examples, the concentration of the secondary reinforcement particles 34 locally at the interface 32, and in particular for carbon nanotubes, is approximately 5% by weight or less. In further examples, the concentration of the secondary reinforcement particles 34 locally at the interface 32 is 0.5% by weight or less, or 0.1% by weight or less. Within a limit, generally a high concentration of the secondary reinforcement particles 34 locally at the interface 32 provides a greater strengthening effect, while a lower concentration locally provides a lower strengthening effect. Thus, in most examples, the secondary reinforcement particles 34 will be uniformly dispersed at the interface 32 in a concentration of at least 0.1% by weight up to approximately 5% by weight. Additionally, as will be appreciated, the concentration of the secondary reinforcement particles 34 may vary somewhat depending on the strengthening effect of the particular selected secondary reinforcement particles 34, surface functionalization, and matrix composition.

Figure 3:
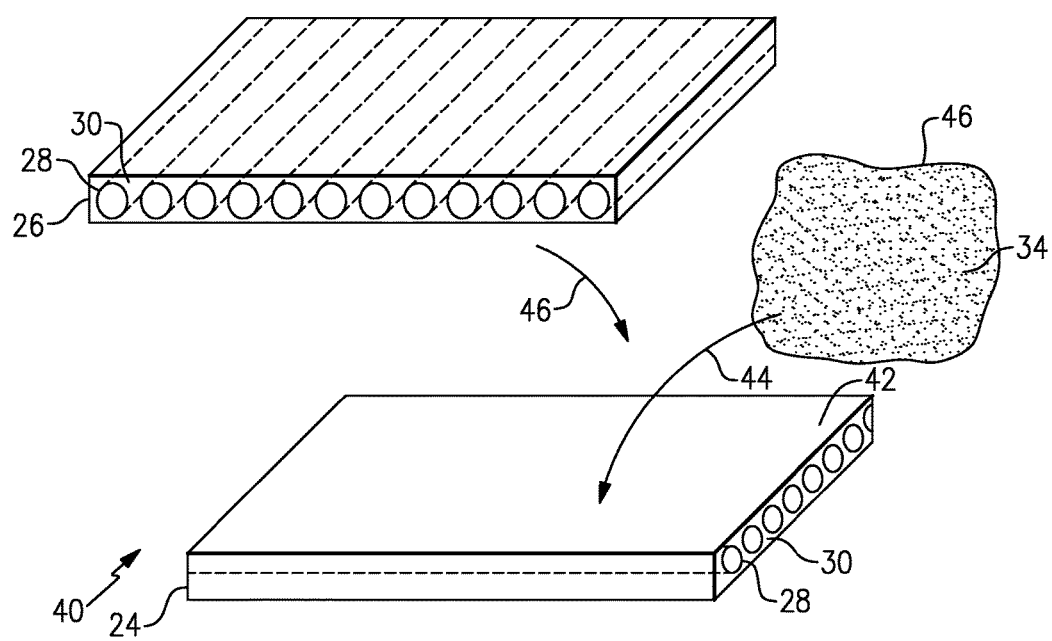
FIG. 3 illustrates an example method of fabricating a composite article.

FIG. 3 schematically illustrates a method 40 of fabricating the composite article 20. In this example, the fiber layers 24 and 26 are initially separate plies. Each of the plies includes the network of fibers 28, as described above. The networks of fibers 28 can be pre-impregnated with a polymer or resin-based material of the matrices 30. For example, the polymer or resin-based material is partially cured such that the individual plies can be more easily manipulated into a stacked arrangement.

In an example process, the secondary reinforcement particles 34 are applied, as represented at 44, to a surface 42 of the first fiber layer 24 or ply that is to be bonded with the second fiber layer 26 or ply. As can be appreciated, the secondary reinforcement particles 34 could alternatively or additionally be applied to the second fiber layer 26. The fiber layers 24 and 26 are then brought into contact with each other, as represented at 46, such that the surface 42 that has the secondary reinforcement particles 34 comes into contact with the second fiber layer 26 or ply. The first and second fiber layers 24 and 26 are then bonded together at the interface 32 such that the interface includes the concentration of the secondary reinforcement particles 34 that were applied to the surface 42 of the first fiber layer 24. For example, heat, pressure, or both is applied to the stack of the fiber layers 24 and 26 to consolidate the layers and fully cure the matrices 30. The heat and pressure can be applied in a mold, to also shape the layers 24 and 26 to a desired end-use or near end-use geometry. Additional processing steps can also be conducted during or after the molding, such as trimming or finishing processes.

In a further example, the application of the secondary reinforcement particles 34 to the surface 42 involves spraying the secondary reinforcement particles 34 onto the surface 42. The secondary reinforcement particles 34 can be sprayed in a pressurized carrier fluid 46 (liquid or gas), for proper uniform dispersion over the surface 42. The spraying enhances dispersion of the secondary reinforcement particles 34, enhances application only to the surface 42 which will form the interface 32, and reduces agglomeration that might otherwise occur if the secondary reinforcement particles 34 were instead mixed directly in and dispersed throughout the matrices 30.

Example carrier gases can be inert or substantially inert with regard to reactivity with the secondary reinforcement particles 34, and can include argon, nitrogen, and helium. Example carrier liquids can include organic solvents, such as water or alcohol-based solvents, though which the secondary reinforcement particles 34 are dispersed. Additionally or alternatively, the carrier fluid 46 can include a polymer-based material in which the secondary reinforcement particles 34 are dispersed. The polymer-based material in one example has an equivalent composition to the polymer-based material used for the matrices 30. Thus, if epoxy is used for the matrices 30, the same composition of epoxy can be used to carry the secondary reinforcement particles 34 during application to the surface 42.

Once bonded, the secondary reinforcement particles 34 bridge across the interface 32 and thus provide strengthening reinforcement in a region that would otherwise be an area of interlaminar weakness between the fiber layers 24 and 26.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
a laminate structure of at least first and second fiber layers, each of the first and second fiber layers including a network of primary reinforcement fibers dispersed in a matrix, the first and second fiber layers being bonded to each other along an interface of the matrices, the matrices including a concentration of carbon nanotubes locally at the interface, wherein the concentration of carbon nanotubes locally at the interface is approximately 5% or less by weight to strengthen the interface, and the matrices include an overall concentration of the carbon nanotubes that is less than the concentration locally at the interface.

2. The composite article as recited in claim 1, wherein the concentration of the carbon nanotubes locally at the interface is 0.5% or less by weight.

3. The composite article as recited in claim 1, wherein the concentration of the carbon nanotubes locally at the interface is at least 0.1% by weight.

4. The composite article as recited in claim 1, wherein a concentration of the carbon nanotubes in the matrices, outside of the interface, is zero.

5. The composite article as recited in claim 1, wherein the network of primary reinforcement fibers are selected from the group consisting of carbon fibers, glass fibers, high-strength polymer fibers, and combinations thereof, and the matrices are polymer-based.

6. The composite article as recited in claim 1, wherein the carbon nanotubes are surface-functionalized with organic molecules to promote bonding with the matrices.

7. The composite article as recited in claim 6, wherein the organic molecules include at least one of amine groups or hydroxyl groups.

8. The composite article as recited in claim 7, wherein the organic molecules include the amine groups.

9. The composite article as recited in claim 7, wherein the organic molecules include the hydroxyl groups.

10. A method of fabricating a composite article, the method comprising:
applying carbon nanotubes to a surface of a first fiber layer that is to be bonded with a second fiber layer, each of the first and second fiber layers includes a network of primary reinforcement fibers disposed in a matrix;
bringing the first and second fiber layers together such that the second fiber layer is in contact with the surface of the first fiber layer that has the carbon nanotubes; and
bonding the first and second fiber layers together at an interface, the interface includes a concentration of the carbon nanotubes locally at the interface to strengthen the interface, wherein the concentration of carbon nanotubes locally at the interface is approximately 5% or less by weight to strengthen the interface, and the matrices include an overall concentration of the carbon nanotubes that is less than the concentration locally at the interface.

11. The method as recited in claim 10, wherein the applying of the carbon nanotubes includes spraying the carbon nanotubes.

12. The method as recited in claim 10, wherein during the applying of the carbon nanotubes, the carbon nanotubes are carried in a fluid carrier.

13. The method as recited in claim 12, wherein the fluid carrier includes an organic solvent.

14. The method as recited in claim 12, wherein the fluid carrier includes a polymer.

15. The method as recited in claim 12, wherein the fluid carrier includes a first polymer and the matrices are polymer-based and include a second polymer, the first polymer and the second polymer having equivalent chemical composition.

16. A composite article comprising:
a laminate structure of at least first and second fiber layers, each of the first and second fiber layers including a network of primary reinforcement fibers selected from the group consisting of carbon fibers, glass fibers, high-strength polymeric fibers, and combinations thereof, disposed in a polymer-based matrix, the first and second fiber layers being bonded to each other along an interface of the polymer-based matrices, the polymer-based matrices including a local concentration of 5% or less by weight of carbon nanotubes at the interface to strengthen the interface and an overall concentration of carbon nanotubes that the less than the concentration at the interface.

17. The composite article as recited in claim 16, wherein the carbon nanotubes are surface-functionalized with organic molecules to promote bonding with the matrices.

18. The composite article as recited in claim 17, wherein the organic molecules include at least one of amine groups or hydroxyl groups.

19. The composite article as recited in claim 18, wherein the organic molecules include the amine groups.

20. The composite article as recited in claim 18, wherein the organic molecules include the hydroxyl groups.

\* \* \* \* \*